United States Patent
Carpenter et al.

(10) Patent No.: US 8,857,706 B2
(45) Date of Patent: Oct. 14, 2014

(54) MAIL PROCESSING SYSTEM WITH LOADED TRAY VALIDATION

(71) Applicants: Michael D. Carpenter, Arlington, TX (US); Morgan H. Dunn, Dallas, TX (US); Stanley W. Sipe, North Richland Hills, TX (US)

(72) Inventors: Michael D. Carpenter, Arlington, TX (US); Morgan H. Dunn, Dallas, TX (US); Stanley W. Sipe, North Richland Hills, TX (US)

(73) Assignee: Siemens Industry, Inc., Alpharetta, GA (US)

(*) Notice: Subject to any disclaimer, the term of this patent is extended or adjusted under 35 U.S.C. 154(b) by 0 days.

(21) Appl. No.: 13/745,880

(22) Filed: Jan. 21, 2013

(65) Prior Publication Data
US 2013/0256401 A1    Oct. 3, 2013

Related U.S. Application Data

(60) Provisional application No. 61/617,193, filed on Mar. 29, 2012.

(51) Int. Cl.
*G06F 17/00* (2006.01)
*G06K 5/00* (2006.01)
*B07C 3/00* (2006.01)

(52) U.S. Cl.
CPC .... *G06K 5/00* (2013.01); *B07C 3/00* (2013.01)
USPC ..................................... 235/375; 235/462.01

(58) Field of Classification Search
CPC ........... G07B 2017/00451; G07B 2017/00491; G07B 2017/00443; G07B 2017/00475; G07B 17/00467; G07B 2017/00483; G07B 2017/00588; G07B 2017/00717; B07C 1/00; B07C 3/00; B07C 3/12; B07C 3/18; G06K 5/00
USPC ............................................ 235/375, 462.01
See application file for complete search history.

(56) References Cited

U.S. PATENT DOCUMENTS

| | | | | |
|---|---|---|---|---|
| 5,475,603 | A * | 12/1995 | Korowotny | 700/213 |
| 7,415,130 | B1 * | 8/2008 | Rundle et al. | 382/101 |
| 8,129,646 | B2 * | 3/2012 | Lee et al. | 209/584 |
| 8,245,933 | B2 * | 8/2012 | Isles et al. | 235/462.02 |
| 2003/0111524 | A1 * | 6/2003 | Wells et al. | 235/375 |
| 2003/0132398 | A1 * | 7/2003 | Wang | 250/492.1 |
| 2005/0167342 | A1 * | 8/2005 | Vullriede et al. | 209/584 |
| 2007/0129957 | A1 * | 6/2007 | Elliott et al. | 705/1 |
| 2008/0091460 | A1 * | 4/2008 | Paul | 705/1 |
| 2008/0192978 | A1 * | 8/2008 | Rundle et al. | 382/101 |
| 2009/0145967 | A1 * | 6/2009 | Carpenter | 235/385 |
| 2009/0294338 | A1 * | 12/2009 | Lee et al. | 209/584 |
| 2010/0106290 | A1 * | 4/2010 | Isles et al. | 700/227 |

* cited by examiner

*Primary Examiner* — Tuyen K Vo

(57) ABSTRACT

Mail processing system, methods, and computer-readable media. A method includes detecting and reading a tray label of a tray being placed on or in the mail processing machine to determine a tray identifier. The tray is a mail item container containing a plurality of mail items to be processed by the mail processing machine in a current mail processing function. The method includes validating the tray identifier for the current mail processing function. The method includes, when the tray identifier is valid for the current mail processing function, activating a valid-tray indicator, and otherwise when the tray identifier is invalid for the current mail processing function, activating an invalid-tray indicator.

20 Claims, 4 Drawing Sheets

MAIL PROCESSING SYSTEM WITH LOADED TRAY VALIDATION

CROSS-REFERENCE TO RELATED APPLICATION

This application claims the benefit of the filing date of U.S. Provisional Patent Application 61/617,193, filed Mar. 29, 2012, which is hereby incorporated by reference.

TECHNICAL FIELD

The present disclosure is directed, in general, to mail processing systems and methods.

BACKGROUND OF THE DISCLOSURE

Improved systems are desirable.

SUMMARY OF THE DISCLOSURE

Various disclosed embodiments include mail processing systems, methods, and computer-readable media. A method includes detecting and reading a tray label of a tray being placed on or in the mail processing machine to determine a tray identifier. The tray is a mail item container containing a plurality of mail items to be processed by the mail processing machine in a current mail processing function. The method includes validating the tray identifier for the current mail processing function. The method includes, when the tray identifier is valid for the current mail processing function, activating a valid-tray indicator, and otherwise when the tray identifier is invalid for the current mail processing function, activating an invalid-tray indicator.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
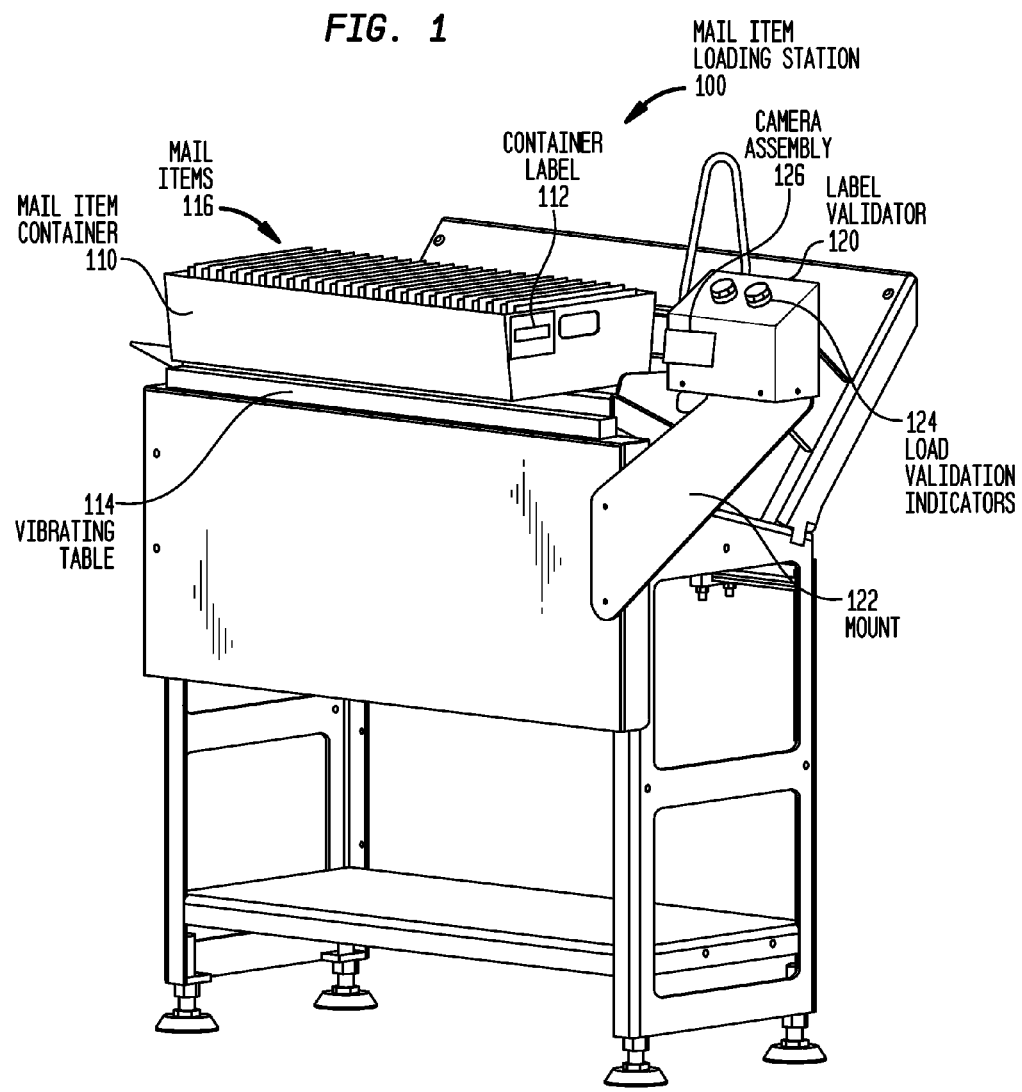
FIG. 1 illustrates a simplified apparatus in accordance with disclosed embodiments.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The preparation of mail items for delivery involves a combination of processing and sorting of the mail items, much of which is typically done using specialized machines that incorporate the required processes and sortation capabilities. Examples of processing include cancelling stamps to prevent their reuse, applying barcodes to improve efficiency, and forwarding mail items for recipients who have updated their residence. Sorting is done to aggregate mail items that require the same distribution and transportation, to aggregate items to the specific mail carrier for delivery, or, in some cases, to actually put mail items in the sequence in which they will be delivered.

Each mail processing and sorting machine is inherently designed to process and sort mail items according to the specific processing required and among destination address ranges, with each of multiple unique sorted outputs, or bins, representing a plurality of mail items requiring the same processing or being of the same destination address range, as specified by a sort plan. Many sort plans are typically used in the processing and sorting of mail items in preparation for delivery, such that mail items are typically processed and sorted more than once to prepare them for delivery. Using multiple sort plans and multiple sorting passes reduces the number of sorting bins that would otherwise be required.

In the multiple steps of processing and sorting that mail items typically undergo, the mail items are put into labeled containers between the processing and sorting steps. A single container is loaded with mail items from the same bin, representing a class of mail items according to the processing and sorting just completed, whereby the entire class requires the same subsequent processing and sortation. The container is typically labeled with information that distinguishes the class. Containers of this class are aggregated, and then processed and sorted according to an algorithm appropriate for that class. The processing and sorting algorithm represents a customization of settings for a mail processing and sorting machine.

Some processing and sorting algorithms, typically those required to arrange mail items into the sequence in which they will be delivered, require multiple processing and sorting steps, or passes, and require containers to be processed in a certain sequence after the first pass. To support these sequence sorting algorithms, mail is stored in labeled containers between passes and is arranged in such a way as to reduce confusion for the operator that loads containers of mail items into the processing and sorting machine after the first pass. To prevent mistakes, the operator that unloads mail items from containers into the mail processing and sorting machine must therefore inspect the label on the container and understand that the designation on the label for the class of mail items in the container corresponds to the class of mail items appropriate to the processing and sorting algorithm currently in use.

When the operator processes containers of mail items using the wrong processing and sorting algorithm, or in an incorrect sequence, some or all of the mail items will not be processed as planned. These mail items will require additional processing, and incur additional costs prior to their delivery. In some cases, mail items will be delivered later than would have been possible because of the additional processing. An automatic system for screening mail items to ensure that only classes of mail items according to their container label are appropriate to the processing and sorting algorithms in use would improve efficiency and reduce cost.

Various disclosed embodiments include systems and methods that read and validate the label on a container of mail items before or during the loading of a mail processing, sorting, or other machine from the contents of the container. The contents of the container of mail, according to the label on the container, are validated to be relevant for loading on the mail processing and sorting machine, and the operator is presented with feedback as to the relevance prior to executing the loading process, such that the loading of containers of mail items that are not relevant may be aborted.

Various embodiments disclosed herein can read the container labels without requiring extensive dedicated motion on the part of the operator, such that the labels are recognized and evaluated automatically, relatively early in the common process otherwise required to load mail items from a container into the feeder. An apparatus as disclosed herein can be integrated with or attached to any number of mail processing systems into which mail is loaded from transportable containers. Disclosed embodiments can determine automatically whether the class of mail items as described by the container label is relevant to the current mail process and inform the operator before the loading itself has begun whether the container and its contents are relevant to the current process.

Information from the tray tag is compared to information for legitimate trays of mail for the particular sortplan currently loaded and in use to determine if the tray contains mail that is both appropriate for the sort plan and presented in the correct sequence. If the tray is appropriate to the operation, an indicator such as a green light is activated. If the tray is not appropriate to the operation, an indicator such as a red light is activated. In other embodiments, the valid-tray indicator and invalid-tray indicator can be mechanical barriers or indicators. For example, the valid-tray indicator can be a barrier that is "activated" when moved to a position to allow loading of the correct tray, and the invalid-tray indicator can be a barrier that is "activated" to prevent loading of an incorrect tray.

These indications come within a split-second of the tray coming near to the loading point, informing the operator whether or not to proceed with loading. Load screening is particularly helpful in two-pass operations, where trays must be fed in the proper sequence on second pass. Since various embodiments can be integrated into the sorting machine or other mail processing machine, this sequence can be monitored and controlled, and only relevant tray scan information is transmitted to plant monitoring systems.

Specific embodiments can be integrated into the loading area of USPS DBCS-type letter sorting machines to provide advanced, image-based barcode recognition, but other embodiments can be integrated into any number of mail processing machines (including parcel, flat, or baggage processing machines).

FIG. 1 illustrates a simplified apparatus in accordance with disclosed embodiments. This figure shows a mail item loading station 100 that can represent the loading station of any number of mail processing systems, and of course the disclosed embodiments are not limited to this specific example. Such a mail item loading station 100 can be used for validating the mail items being loaded into a mail processing and sorting machine.

In this example, the mail item loading station 100, which can be part of or attached to some mail processing machine, is designed with a vibrating table 114 to improve the edging of flat mail items 116 being fed from mail item container 110. The mail item loading station 100 has been fitted with a label validator assembly 120, mounted on mount 122. The position of the label validator assembly 120 is such that an optical camera component 126 mounted within or on the label validator assembly 120 captures an image of the end of the mail item container 110 (or "tray"), as the tray is being positioned prior to feeding. Label validator assembly 120 includes, in this example, colored lights as load validation indicators 124.

The field of view of the optical camera assembly 126 therefore includes the barcoded container label 112, as further described below. The positioning of the optical camera component 126 allows the container label to be read without significant dedicated motion from the operator, which prevents the reading of the tray from reducing the productivity of the operator.

Figure 2:
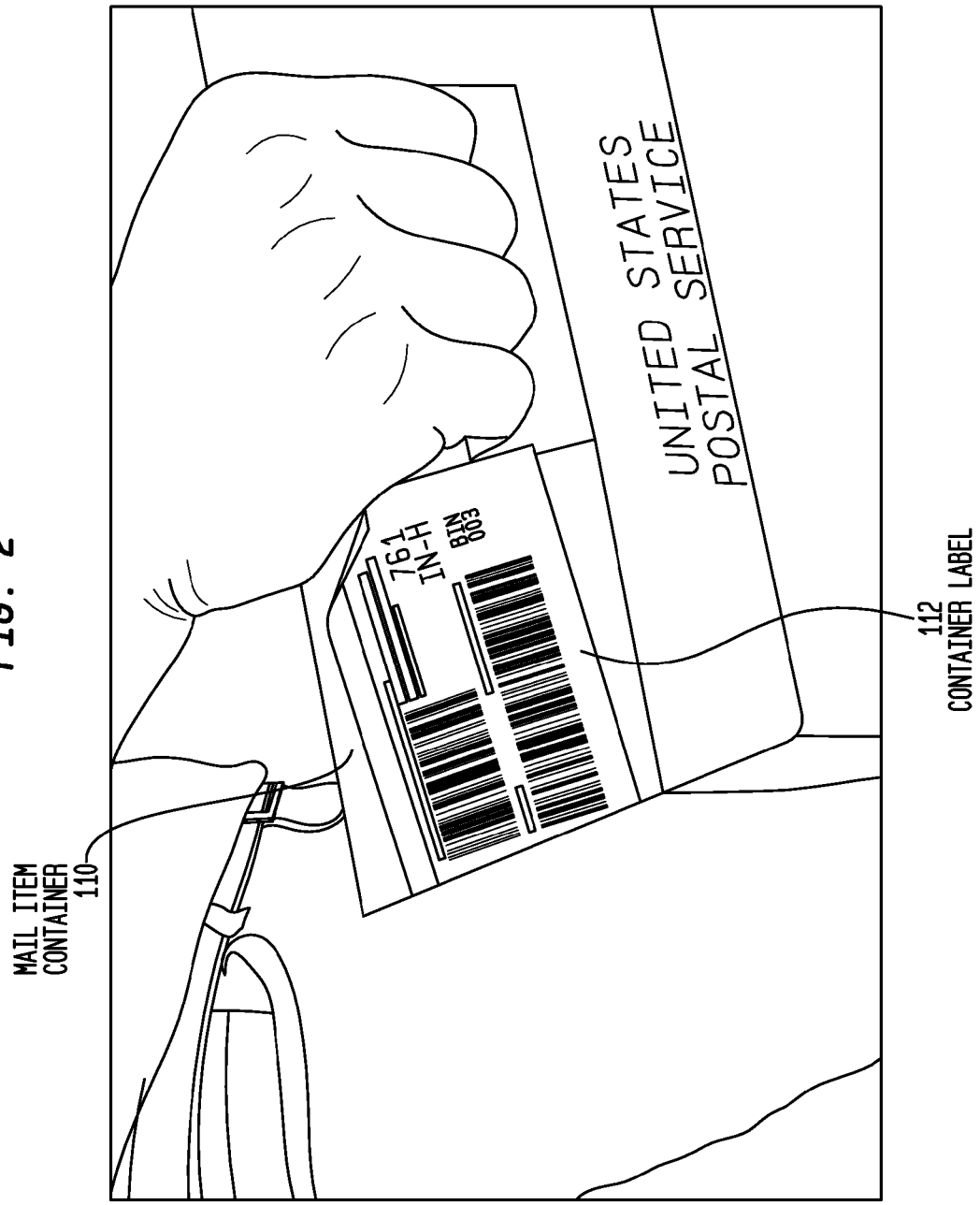
FIG. 2 illustrates the viewing "perspective" of the optical camera component for the label validation assembly, including the barcode container label regions of the mail item container, in accordance with disclosed embodiments.

FIG. 2 illustrates the viewing "perspective" of the optical camera component 126 for the label validator assembly 120, including the barcode container label regions 112 of the mail item container 110.

Figure 3:
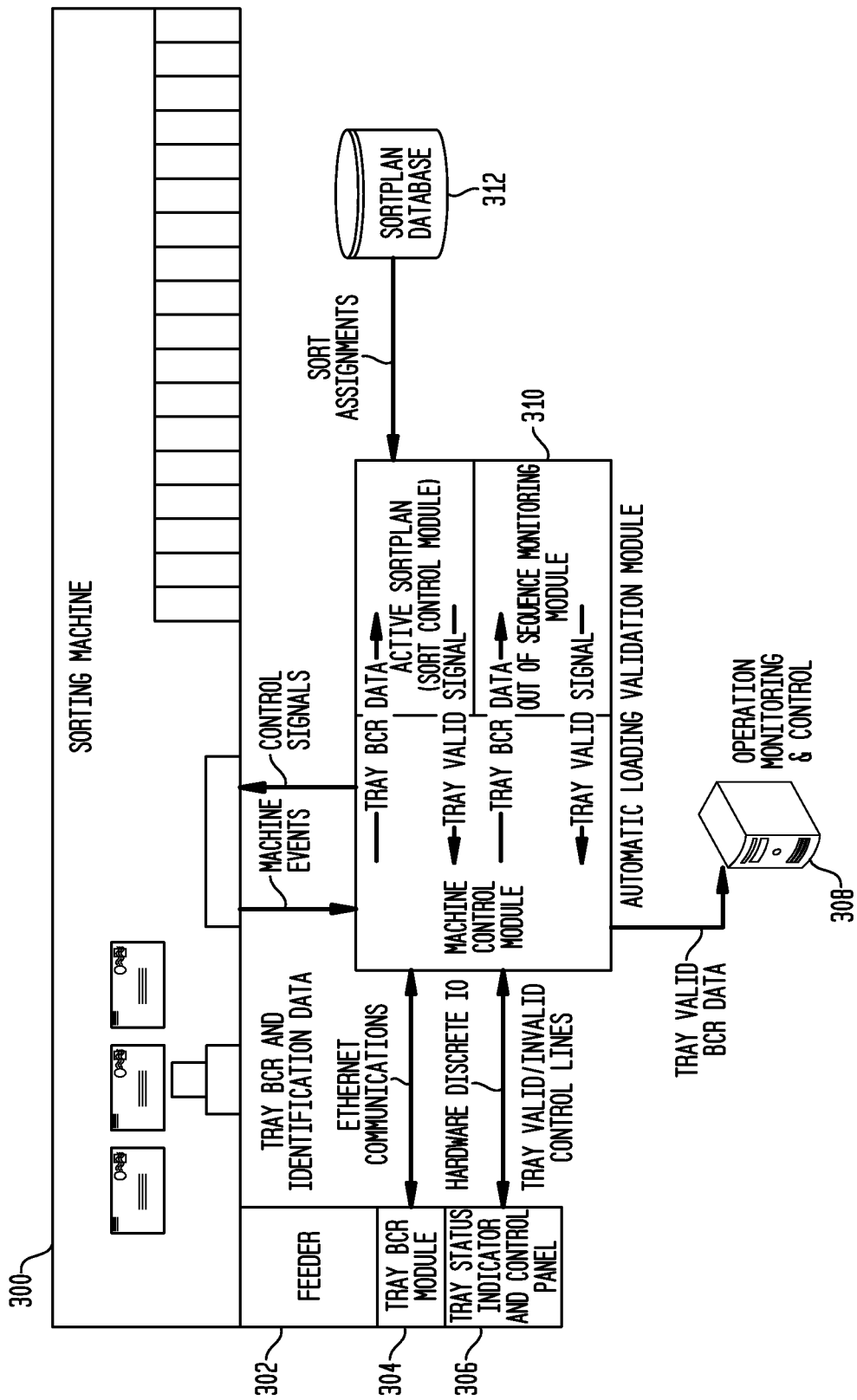
FIG. 3 depicts a functional diagram of aspects of a system and process in accordance with disclosed embodiments.

As the mail item container 110 is presented or placed into the mail item loading station 100, barcodes on the barcoded container label 112 are automatically read, and the results are passed to the automatic loading validation process. The loading validation process, which is illustrated in FIG. 3, compares the container's barcode read (BCR) results to the table of relevant incoming material, according to two sources, in some embodiments. The first source can be the active sortplan, which controls and describes the active processing sorting algorithm for the current operation. The second source can be the out-of-sequence monitoring system, which validates according to a prescribed order of tray loading for a processing pass.

FIG. 3 depicts a functional diagram of aspects of a system and process as disclosed herein, in a specific exemplary embodiment, used to illustrate a loading validation process. This figure shows a sorting machine 300, though other embodiments can use any suitable mail processing machine. Sorting machine 300 has a feeder 302 that receives mail items from mail containers (also referred to as "trays"). Feeder 302 can be a mail item loading station 100. Feeder 302 includes a tray BCR module 304 and a tray status indicator and control panel 306, which together can implement hardware portions of a label validator 120.

The label validation process is managed and performed, in this embodiment, by an automatic loading validation module 310, which communicates with the tray BCR module 304 and tray status indicator and control panel 306 using such connections as Ethernet and discrete hardware input/output connections, including tray valid/invalid control lines.

Automatic loading validation module 310 can include one or more processors, controllers, and memories configured to perform processes as described herein. Automatic loading validation module 310 can include or communicate with an active sort control module that manages the active sortplan, an out-of-sequence monitoring module, and/or a machine control module. Automatic loading validation module 310 can also communicate with a sortplan database 312, for example to receive sort assignments, and with an operation monitoring and control system 308, for example to communicate tray BCR data.

Automatic loading validation module 310 can communicate with the tray BCR module 304, such as by the machine control module, to receive the tray BCR and identification data read from the trays being loaded into the feeder 302. The machine control module can send the tray BCR data to the sort control module and the out-of-sequence monitoring module, and each of these can send tray valid/invalid signals back to the machine control module. The automatic loading validation module 310 can then activate the tray valid/invalid control lines to the tray status indicator and control panel 306, which can activate appropriate indicators such as valid/invalid lamps. The sort control module determines whether the tray BCR and identification data corresponds to mail items that are appropriate to the current sort plan. Similarly, the out-of-sequence monitoring module determines whether the tray BCR and identification data corresponds to mail items that are appropriate to be loaded at that specific time in order for the sort plan to be executed correctly.

Automatic loading validation module 310 can also receive machine events from machine 300 and send control signals to machine 300.

If the tray label barcode information correlates to the active sortplan and the out-of-sequence monitoring module, the operator is given positive feedback, such as a green light at the tray status indicator and control panel 306. Trays that have been successfully correlated are expected to be fed, and tray BCR information for these trays can be sent to operational monitoring and control systems, representing an update to the status of the mail in work across the multiple processing and sorting systems.

If the tray label barcode information does not correlate to either source, negative feedback, such as a red light, is provided at the tray status indicator and control panel 306. In some embodiments, the specific information that does not correlate can be displayed on the main human machine interface for the mail processing and sorting machine.

In some embodiments, it may not be desirable to integrate the loading validation function into sophisticated core processes of the mail processing and sorting machine. Instead, the loading validation function may operate in a standalone mode in which stored tray information is recognized as relevant. Is such an embodiment, a means of adding relevant tray information to the database can be implemented, for example, by a controller storing tray label information in a table in a memory. In this example of a rudimentary embodiment, a pushbutton, a green indicator, a red indicator, a tray detector, and a camera and reading device are controlled together to provide load validation and a means of specifying "legal" tray codes at the tray status indicator and control panel 306.

Figure 4:
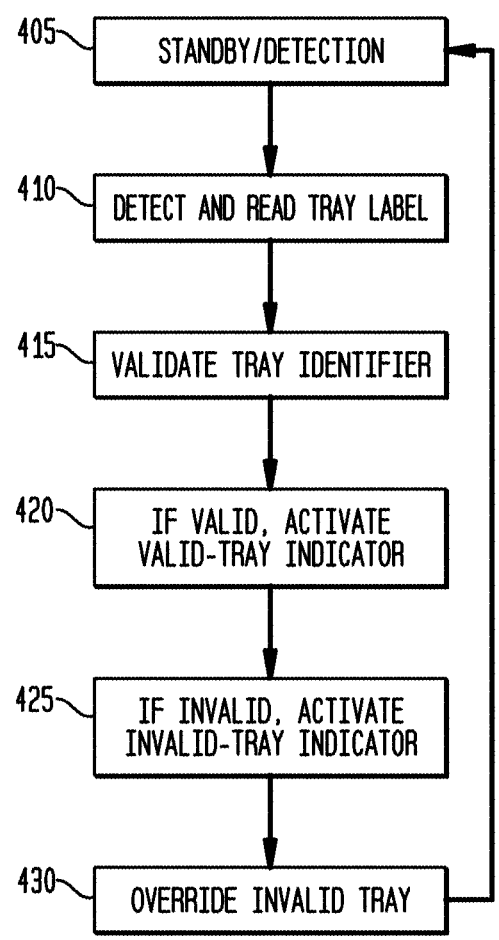
FIG. 4 depicts a flowchart of a process in accordance with disclosed embodiments.

FIG. 4 is a flowchart of a process in accordance with disclosed embodiments. In this example, the "system" refers to a mail processing machine, configured to operate as described, having an optical camera component positioned to read labels on trays as they are being loaded into the system.

The system maintains a standby/detection state (step 405). In this state the system is scanning for tray labels, and typically neither the tray valid indicator nor the tray invalid indicator is activated. The system, at this time, is performing a mail processing operation.

The system detects and reads a tray label (step 410). This can occur when the tray is being loaded into (including onto) the system for the mail items it contains to be fed into the system. The tray label can include one or more barcodes as described above that represent the tray identifier, or the "label" can optionally be some other identifying label, tag, or marker in or on the tray, including RFID and near-field tags. The tray label is read to determine a tray identifier that is associated with the contents of the tray.

The system validates the tray identifier for the current mail processing function (step 415). This step can include determining if the tray identifier corresponds to an active sortplan, such as determined by a sort control module, or determining if the tray identifier corresponds to a prescribed order of trays for a processing pass, such as determined by an out-of-sequence monitoring module. This step can also include determining if the tray identifier is included in a list of valid tray identifiers, as may be stored in a sortplan database or sortplan table. This step can be performed by an automatic loading validation module.

When the tray identifier is valid for the current mail processing function, the system activates a valid-tray indicator (step 420). The valid-tray indicator is a green lamp, LED, or other light, in some embodiments. In other embodiments, the valid-tray indicator can be a mechanical barrier or indicator. For example, the valid-tray indicator can be a barrier that is "activated" when moved to a position to allow loading of the correct tray.

Otherwise, when the tray identifier is invalid for the current mail processing function, the system activated an invalid-tray indicator (step 425). The invalid-tray indicator is a red lamp, LED, or other light, in some embodiments. In other embodiments, the invalid-tray indicator can be a mechanical barrier or indicator. For example, the invalid-tray indicator can be a barrier that is "activated" to prevent loading of an incorrect tray.

Optionally, when the tray identifier is invalid for the current mail processing function, the system can receive an override from a user (step 430). For example, the system may include an override button or other user input that can indicate that the operator intends to override the invalid tray identifier. As part of this step, for example, the system can determine that the override button was pressed or held momentarily or for a predetermined amount of time. When the override is received, the system can add the tray identifier to the list of valid tray identifiers.

After displaying the indicator, the system returns to the standby/detection state (at step 405). This can include deactivating the valid-tray indicator or the invalid-tray indicator.

Various embodiments can provide a number of features with specific technical and commercial advantages. Various embodiments can notify an operator, as a tray is being loaded to the system, whether or not the tray is valid for the current sort plan, sequence, or process.

It is important to note that while the disclosure includes a description in the context of a fully functional system, those skilled in the art will appreciate that at least portions of the mechanism of the present disclosure are capable of being distributed in the form of computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

For example, various embodiments include systems, method, and computer-readable media. The computer-readable media includes instructions executable to cause a mail processing machine to detect and read a tray label of a tray being placed on or in the mail processing machine to determine a tray identifier, wherein the tray is a mail item container containing a plurality of mail items to be processed by the mail processing machine in a current mail processing function. The instructions cause the mail processing machine to validate the tray identifier for the current mail processing function, and when the tray identifier is valid for the current mail processing function, activate a valid-tray indicator, and otherwise, when the tray identifier is invalid for the current mail processing function, activate an invalid-tray indicator.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a mail processing machine, the method comprising:
   detecting and reading a tray label of a tray being placed on or in the mail processing machine to determine a tray identifier, wherein the tray is a mail item container containing a plurality of mail items to be processed by the mail processing machine in a current mail processing function;
   validating the tray identifier for the current mail processing function; and
   when the tray identifier is valid for the current mail processing function, activating a valid-tray indicator, and otherwise when the tray identifier is invalid for the current mail processing function, activating an invalid-tray indicator.

2. The method of claim 1, wherein the tray label is a label on the mail item container that includes a barcode representing the tray identifier, and the invalid-tray indicator includes a barrier that prevents loading of the tray when activated.

3. The method of claim 1, wherein validating the tray identifier includes determining if the tray identifier corresponds to an active sortplan.

4. The method of claim 1, wherein validating the tray identifier includes determining if the tray identifier corresponds to a prescribed order of trays for a processing pass.

5. The method of claim 1, wherein validating the tray identifier includes determining if the tray identifier is included in a list of valid tray identifiers.

6. The method of claim 1, wherein the valid-tray indicator is a green light and the invalid-tray indicator is a red light.

7. The method of claim 1, wherein the mail processing machine transmits the tray identifier to a plant monitoring system when the tray identifier is valid for the current mail processing function.

8. The method of claim 1, wherein, when the tray identifier is invalid for the current mail processing function, the mail processing machine receives an override from a user.

9. The method of claim 8, wherein when an override is received from the user, the tray identifier is added to a list of valid tray identifiers.

10. The method of claim 8, wherein the override is received from the user via a pushbutton input while the invalid-tray indicator is activated.

11. An apparatus, comprising:
    a mail item loading station configured to receive a tray, wherein the tray is a mail item container containing a plurality of mail items to be processed by a mail processing machine in a current mail processing function;
    a label validator assembly including an optical camera component and at least one tray status indicator, the label validator assembly positioned so that the optical camera component can detect and read a tray label of the tray to determine a tray identifier,
    wherein the apparatus is configured to
    detect and read the tray label to determine the tray identifier,
    validate the tray identifier for the current mail processing function; and
    when the tray identifier is valid for the current mail processing function, activating a valid-tray indicator of the tray status indicator, and otherwise when the tray identifier is invalid for the current mail processing function, activating an invalid-tray indicator of the tray status indicator.

12. The apparatus of claim 11, wherein the tray label is a label on the mail item container that includes a barcode representing the tray identifier, and the invalid-tray indicator includes a barrier that prevents loading of the tray when activated.

13. The apparatus of claim 11, wherein validating the tray identifier includes determining if the tray identifier corresponds to an active sortplan.

14. The apparatus of claim 11, wherein validating the tray identifier includes determining if the tray identifier corresponds to a prescribed order of trays for a processing pass.

15. The apparatus of claim 11, wherein validating the tray identifier includes determining if the tray identifier is included in a list of valid tray identifiers.

16. The apparatus of claim 11, wherein the valid-tray indicator is a green light and the invalid-tray indicator is a red light.

17. The apparatus of claim 11, wherein the apparatus transmits the tray identifier to a plant monitoring system when the tray identifier is valid for the current mail processing function.

18. The apparatus of claim 11, wherein, when the tray identifier is invalid for the current mail processing function, the apparatus receives an override from a user.

19. The apparatus of claim 18, wherein when an override is received from the user, the tray identifier is added to a list of valid tray identifiers.

20. The apparatus of claim 11, wherein the apparatus is integrated with the mail processing machine.

* * * * *